US008156172B2

(12) United States Patent
Muehl et al.

(10) Patent No.: US 8,156,172 B2
(45) Date of Patent: Apr. 10, 2012

(54) MONITORING AND REPORTING ENTERPRISE DATA USING A MESSAGE-BASED DATA EXCHANGE

(75) Inventors: Gordon Muehl, Oestringen (DE); Daniel Niehoff, Sandhausen (DE); Jens Staeck, Sandhausen (DE)

(73) Assignee: SAP AG, Walldorf (DE)

( * ) Notice: Subject to any disclaimer, the term of this patent is extended or adjusted under 35 U.S.C. 154(b) by 1092 days.

(21) Appl. No.: 10/986,265

(22) Filed: Nov. 10, 2004

(65) Prior Publication Data

US 2006/0098647 A1    May 11, 2006

(51) Int. Cl.
G06F 15/16      (2006.01)
G06F 15/173     (2006.01)

(52) U.S. Cl. .................. 709/201; 709/223; 709/224

(58) Field of Classification Search .................. 709/201; 707/10, 104.1
See application file for complete search history.

(56) References Cited

U.S. PATENT DOCUMENTS

| 6,286,052 | B1* | 9/2001 | McCloghrie et al. | 709/238 |
| 6,738,975 | B1* | 5/2004 | Yee et al. | 719/310 |
| 7,162,534 | B2* | 1/2007 | Schleiss et al. | 709/232 |
| 2001/0053129 | A1* | 12/2001 | Arsikere et al. | 370/250 |
| 2002/0023172 | A1* | 2/2002 | Gendron et al. | 709/238 |
| 2002/0062190 | A1* | 5/2002 | Hameleers et al. | 701/117 |
| 2003/0014500 | A1* | 1/2003 | Schleiss et al. | 709/218 |
| 2003/0055668 | A1* | 3/2003 | Saran et al. | 705/1 |
| 2003/0088544 | A1* | 5/2003 | Kan et al. | 707/3 |
| 2003/0097457 | A1* | 5/2003 | Saran et al. | 709/230 |
| 2003/0210649 | A1* | 11/2003 | Bondi | 370/229 |
| 2004/0199592 | A1* | 10/2004 | Gould et al. | 709/206 |
| 2004/0221296 | A1* | 11/2004 | Ogielski et al. | 719/313 |

* cited by examiner

*Primary Examiner* — Kevin Bates
*Assistant Examiner* — Mohammed Ahmed
(74) *Attorney, Agent, or Firm* — Schwegman, Lundberg & Woessner, P.A.

(57) ABSTRACT

Systems and techniques for monitoring and reporting enterprise data by using a message-based data exchange. In one general aspect, the invention features a computer-implemented method that includes receiving at a message hub one or more messages from one or more sources. A message includes enterprise data. The method includes selecting a message from among the one or more messages, using an extractor implemented at the message hub to extract enterprise data from the selected message, and obtaining information regarding message traffic through the message hub. The method includes selecting a destination and sending to the destination the extracted enterprise data and information regarding message traffic.

20 Claims, 5 Drawing Sheets

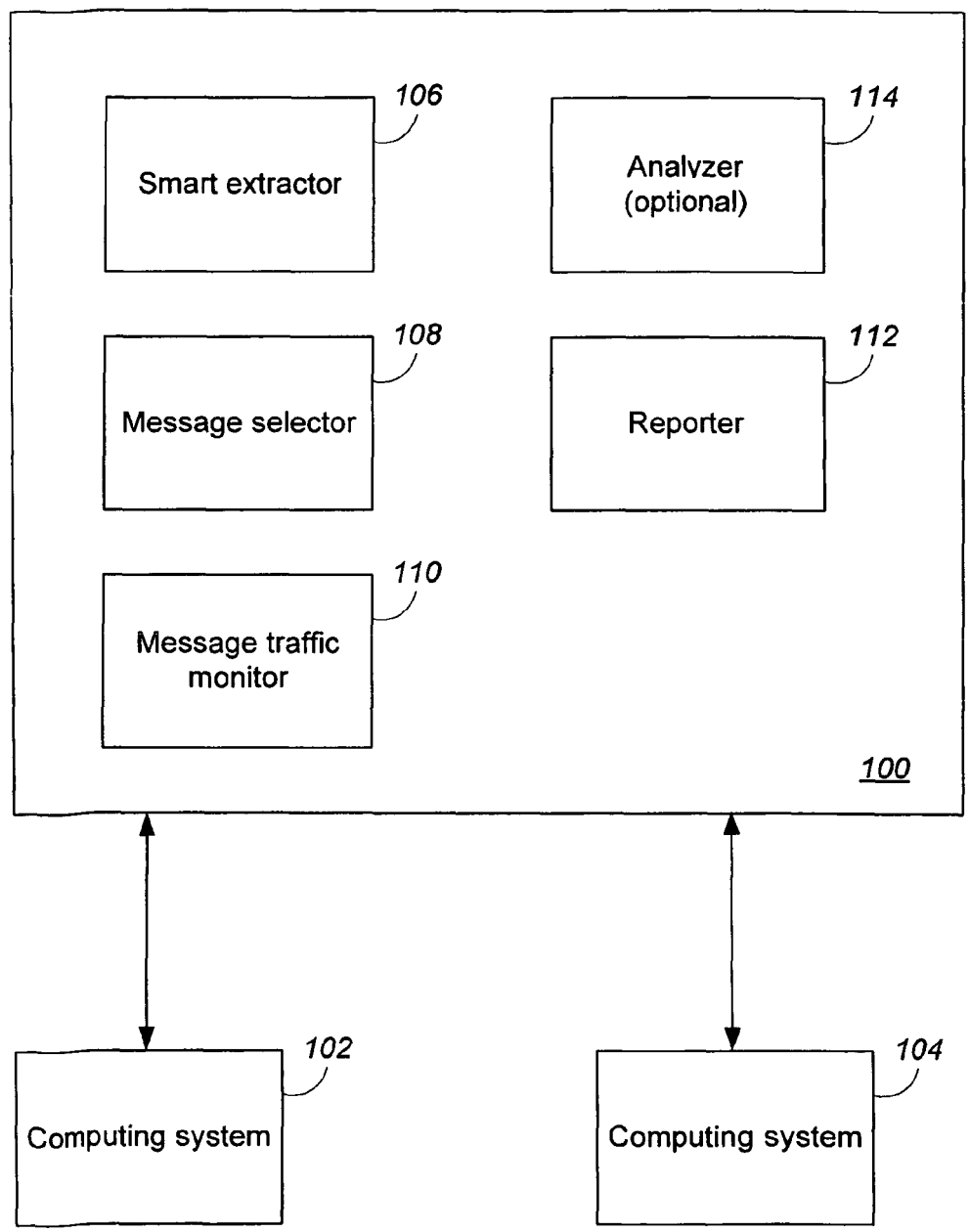
FIG._1

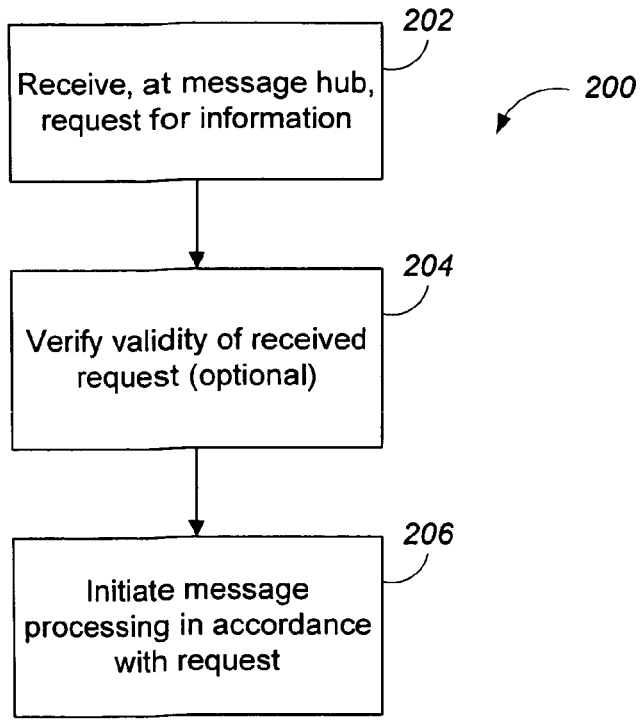
FIG._2
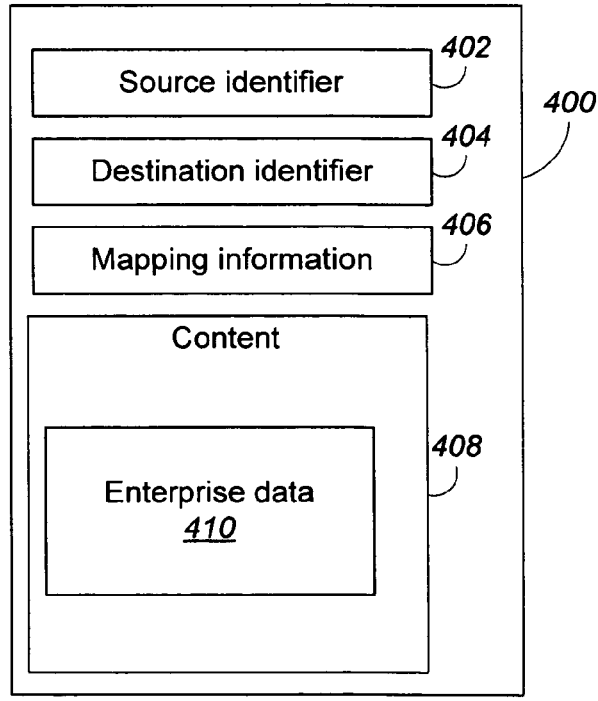
FIG._4

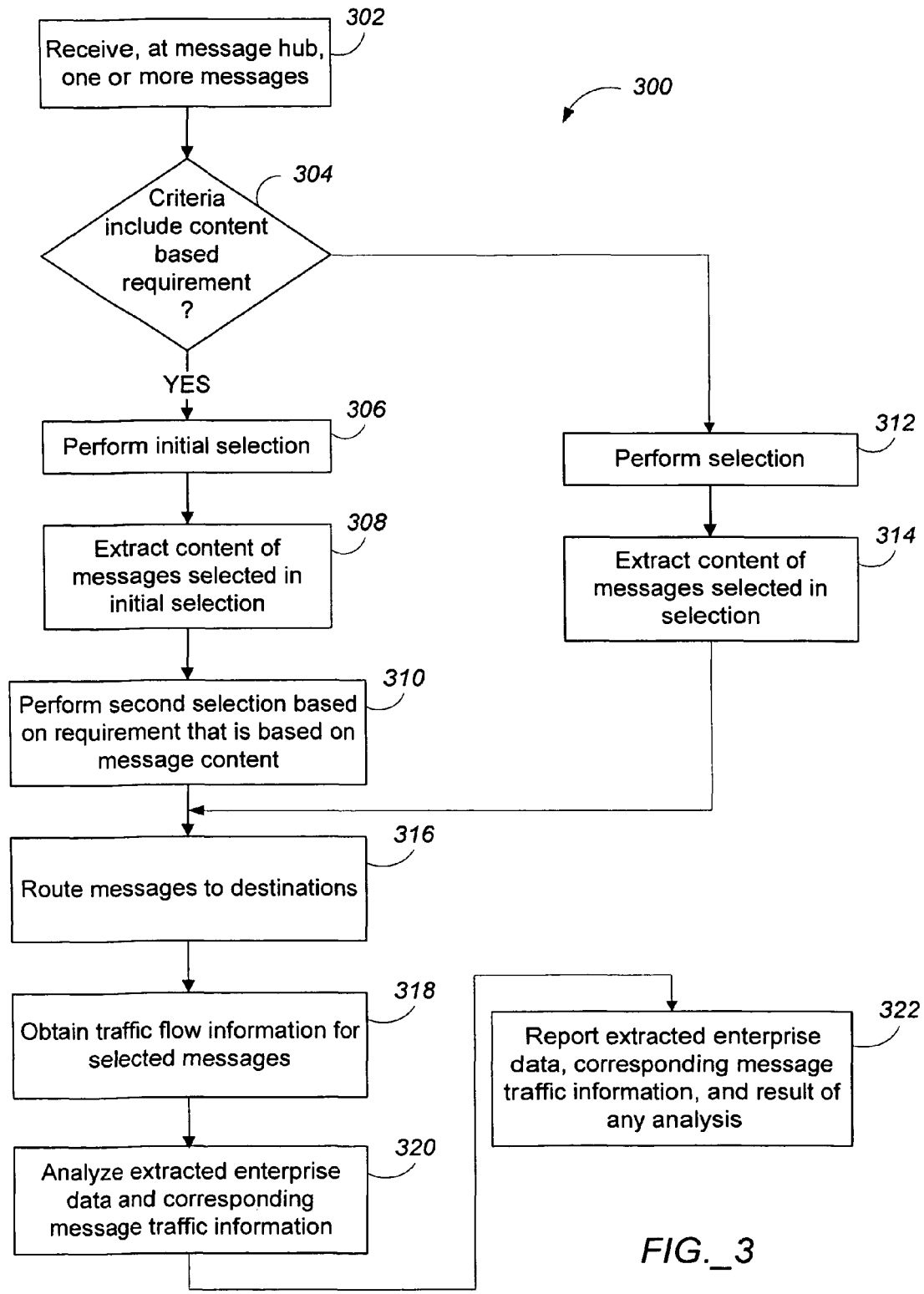
FIG._3

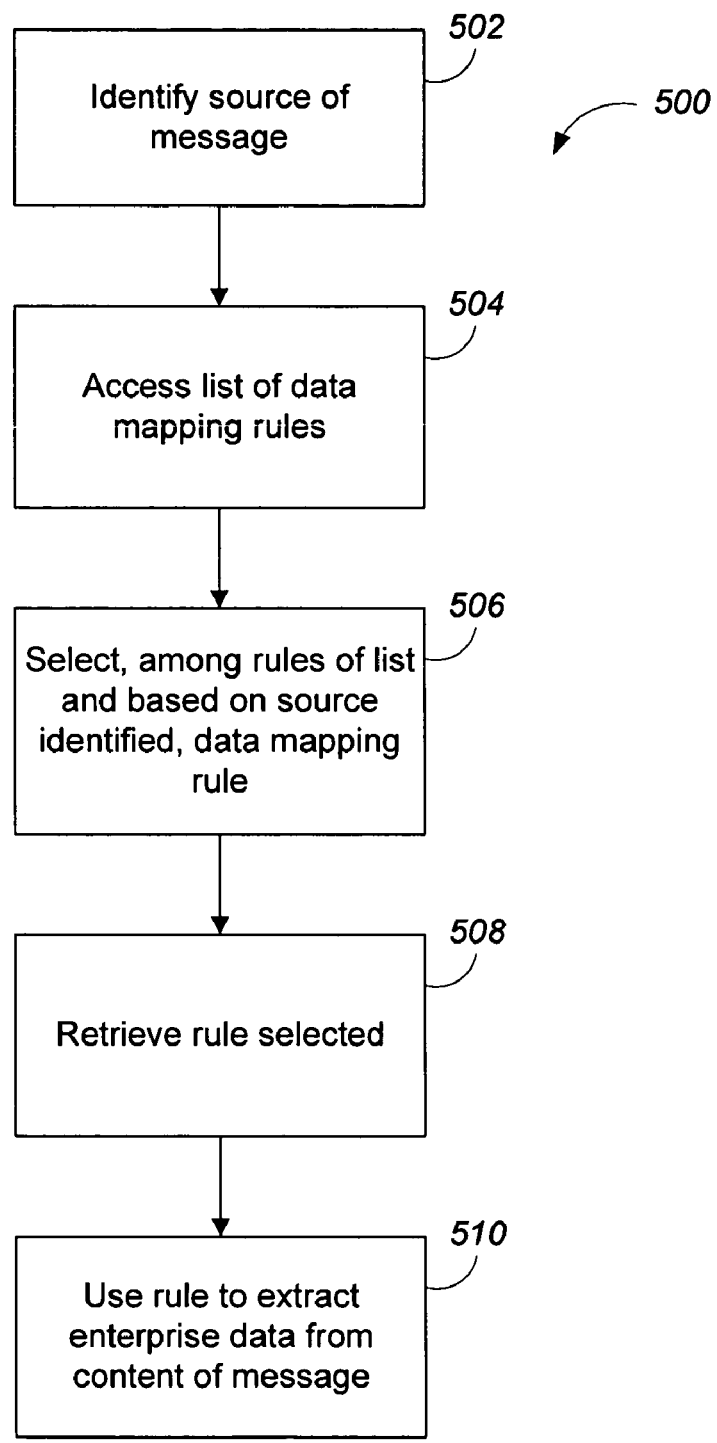
FIG._5

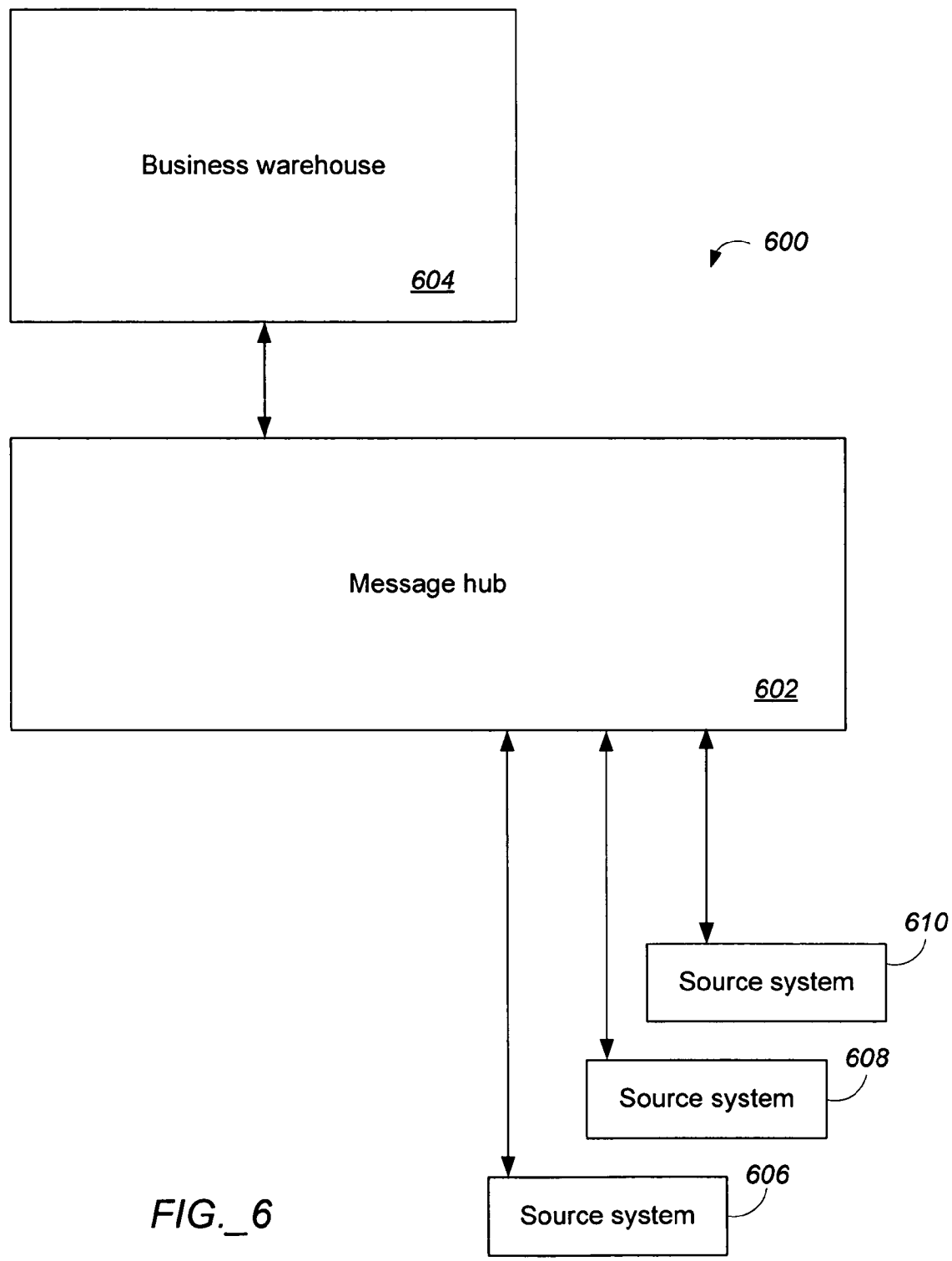
FIG._6

MONITORING AND REPORTING ENTERPRISE DATA USING A MESSAGE-BASED DATA EXCHANGE

BACKGROUND

An enterprise typically employs one or more computer systems that execute business operations, which can include, for example, manufacturing, marketing, development, order processing, and maintenance. The computer systems usually process and store data pertinent to the business operations of the enterprise. Such data, referred to in the instant application as enterprise data, can be implemented as data objects and, furthermore, represent a variety of business-related items. By way of example, enterprise data of an order processing computer system can represent a customer order, and enterprise data of a maintenance system can represent a piece of equipment that requires corrective maintenance.

Enterprise data used in one of the computer systems can be different in several respects when compared with enterprise data used in another of the computer systems. For instance, enterprise data of different computer systems can, for example, have different formats, be of a different type, and be subject to different constraints.

To facilitate analysis of enterprise data of the computing systems, one can implement a business warehouse. A business warehouse is generally a component that stores and organizes historical enterprise data extracted from the computer systems, thus facilitating analysis from an enterprise-wide perspective. Each of the computer systems from which enterprise data is extracted, referred to in the instant specification as a source system, implements its own respective extractor for extracting data and sending the data to the business warehouse.

SUMMARY

The present invention provides methods and apparatus, including computer program products, for monitoring and reporting enterprise data using a message-based data exchange. The exchange of enterprise data of one or more enterprises is effected by a message hub configured to extract enterprise data from the content of selected messages passing through the message hub at a particular point in time and associate, with the extracted data, information regarding message traffic flow conditions occurring at the particular point in time or at a time interval that includes the particular point in time. The message hub is configured to report the extracted enterprise data and the associated traffic flow information in real-time.

In one general aspect, the invention features a computer-implemented method that includes receiving at a message hub one or more messages from one or more sources. A message includes enterprise data. The method includes selecting a message from among the one or more messages, using an extractor implemented at the message hub to extract enterprise data from the selected message, and obtaining information regarding message traffic through the message hub. The method includes selecting a destination and sending to the destination the extracted enterprise data and information regarding message traffic.

In another general aspect, the invention features a business warehouse system. The system includes one or more source systems configured to communicate with each other by exchanging one or more messages, wherein a message includes enterprise data. The system includes a message hub through which all message exchanged between or among the one or more source systems are routed. The message hub includes a smart extractor. The message hub is configured to select a message from among the one or more messages, use the smart extractor to extract enterprise data from the selected message, and obtain information regarding message traffic through the message hub. The system includes a business warehouse connected to receive, in real-time and from the message hub, the extracted enterprise data and the information regarding message traffic.

In another general aspect, the invention features a computer program product, tangibly stored on machine readable medium. The product includes instructions operable to cause a processor to receive at a message hub one or more messages from one or more sources, wherein a message includes enterprise data. The product includes instructions to select a message from among the one or more messages, use an extractor implemented at the message hub to extract enterprise data from the selected message, and obtain information regarding message traffic through the message hub. The product includes instructions to select a destination and send to the destination the extracted enterprise data and information regarding message traffic.

The invention can be implemented to realize one or more of the following advantages. A system in accordance with the invention allows highly probative analysis of enterprise data because it provides not only enterprise data but also information regarding message flow traffic associated with such enterprise data. The system can provide, for example, not only the specifics of a customer order sent from one location to another but also the number of such orders sent during a time interval. In a sense, the system allows one to see through the figurative outer skin of a message and provides information regarding content traffic (as opposed to message traffic information, which provides no indication of content). One can see, for example, the number of customer orders flowing into Europe. The system provides the described data and information in real-time and, thus, facilitates decision making that demands real-time analysis. In implementations where all messages exchanged between or among source systems of the business warehouse are routed through the message hub, the system can provide a holistic perspective. That is, the enterprise collected and the message flow information reflects a state of the entire landscape of the system. If the system includes source systems that are implemented by one enterprise, for example, the system provides an enterprise wide perspective. If the system includes source systems that are implemented by different enterprises, then the system provides a multi-enterprise perspective. The system is flexible in that it can process all or only a subset of all messages being exchanged between or among the sources systems. The subset can be defined by user configurable criteria. The system saves computing resources as it requires only one extractor, and each of the source systems of a business warehouse need not have its own extractor.

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 1 is a block diagram of a message hub in accordance with the invention.

FIG. 2 shows a method for configuring the message hub.

FIG. 3 shows a method for processing messages at the message hub.

FIG. 4 shows an example of a message and its content.

FIG. 5 shows an method for extracting enterprise data from the content of a message received at the message hub.

FIG. 6 shows a business warehouse system in accordance with the invention.

Like reference symbols in the various drawings indicate like elements.

DETAILED DESCRIPTION

FIG. 1 is a block diagram of a message hub 100 in accordance with the invention. The message hub is configured to receive and route all message traffic between or among a group of two or more computing systems, for example, computing systems 102 and 104, which can belong to one or more enterprises. At any one point in time or interval of time, there can be one or more messages received at the message hub. The message hub 100 includes a smart extractor 106, a message selector 108, a message traffic monitor 110, a reporter 112, and an optional analyzer 114, all of which can operate in conjunction with each other in real-time to monitor and report extracted enterprise data and message traffic.

The smart extractor 106 is configured to extract enterprise data from the content of a message received at the message hub. The smart extractor 106 includes logic that allows it to select, by identifying the source of a message, the appropriate data mapping rules for extracting enterprise data from the message's content. The mapping rules can be stored on a same computing device on which the smart extractor 106 is executing or, alternatively, remotely from the computing device. In the latter case, the smart extractor 106 can access the mapping rules through, for example, a network such as the Internet.

The smart extractor 106 can provide the extracted data to a business warehouse like SAP Business Information Warehouse, available from SAP AG of Walldorf, Germany. In this case, the two or more computing systems are source systems to the business warehouse. The smart extractor 106, by its implementation at the message hub 100 and its ability to select and use the appropriate data mapping rules, eviscerates the need for one to implement an extractor at each source system, as is done in conventional business warehouse systems.

The message selector 108 is configured to select, among the messages received at the message hub 100. Criteria for selection can be based on, for example, a source of the message, a destination of the message, content of the message (i.e., the enterprise data), a length of time, or a particular point or time interval, or any combination of these items. There can be multiple sets of criteria, and the message selector 108 can simultaneously apply one or more of the sets. By way of example, there can be a first set of criteria that specifies messages sent from the first computing system 102 and not those sent from the second computing system 104. A second set of criteria can specify messages sent from the first computing system 102 and having content that includes enterprise data that represents a customer order for a particular product. The message hub 108, in applying the first and second sets of criteria, would select all messages sent from the first computing system 102.

Selection can be used for several purposes, including, for example, determining which messages to extract content from and/or determining which messages are counted in a message traffic measurement. Messages selected for extraction are sent to the above-described smart extractor 106. Extracted messages can be subject to further selection based on the extracted content. Messages selected for monitoring are sent to the message traffic monitor 110, which is described below.

The message traffic monitor 110 is configured to monitor message traffic for all or a subset of all messages being exchanged between the two or more computing systems. Message traffic is generally information that can indicate where messages are coming from, where messages are going to, and the number of messages that are routed, through some particular path or node, per unit of time. The message traffic monitor 110 works in conjunction with the message selector 108 to monitor message traffic. The message traffic that is monitored is specified by the above-described criteria of the message selector 108. By way of example, the message traffic being monitored can be for messages that satisfy the above-described first or second set of criteria. Messages that satisfy the first set of criteria can be separately and simultaneously monitored with messages that satisfy the second set of criteria. That is, the message traffic monitor 110 can separately and simultaneously track messages that satisfy the first set of criteria and messages that satisfy the second set of criteria (even when the latter is a subset of the former as is the case in the instant example). The message traffic monitor 110 can provide message traffic information, for example, information specifying that there have been, in the past half an hour, 99 messages that satisfy the first set of criteria and 86 messages that satisfy the second set of criteria. As mentioned above, the monitoring and indication can be provided in real-time.

The reporter 112 is configured to send extracted enterprise data and information describing the appropriate message traffic to one or more destinations, which can be one of the two or more computing systems, the business warehouse, a client computer, or a portable computing device. The reporter 112 collects message traffic information and the corresponding enterprise data extracted from the content of the messages and sends them to one or more destinations.

Optionally, the message hub 100 includes an analyzer 114 configured to evaluate and analyze the extracted enterprise data in view of the message traffic information. Analysis can include, for example, classifying the enterprise data, identifying the enterprise associated with the enterprise data, counting the instances of a particular type of enterprise data (e.g., counting the instances or customer orders placed with a particular enterprise in a particular geographical region).

Alternatively to the above described configuration, the above-described components of the message hub 100 can be otherwise configured. For example, two or more of them can be combined so that their respective functions are performed by a single component, or one of the components can be divided so that its functions can be performed by multiple components.

FIG. 2 shows a method 200 for configuring the above-described message hub 100. The message hub 100 receives a request for information (step 202). The request includes information specifying the information sought, for example, the above-described criteria for selecting messages to be monitored. The request further includes information specifying one or more destinations to that are to receive the information sought. The request can be sent from a source that is remote from a computing device on which the message hub executes, one of the two or more computing systems, or a data warehouse. Optionally, the message hub 100 verifies that the request is valid (step 204). Verifying validity includes determining whether the criteria specified by the request can be applied. Criteria that specify, for example, a particular time interval that has passed or a source that does not exist cannot be applied. The message hub 100 initiates the processing of messages in accordance with the request (step 206). During processing the message hub monitors message traffic and extracts enterprise data from the message being monitored.

FIG. 3 shows a method 300 for processing messages at the above-described message hub 100. The message hub 100 receives one or more messages (step 302). All messages exchanged between or among the two or more computing systems can be routed through the message hub 100. Messages include content, which can include enterprise data.

FIG. 4 shows an example of a message 400 and its content. The message 400 includes an identifier 402 of a source that sent the message, e.g., one of the two or more computing systems. The message 400 includes an identifier 404 of one or more destinations of the message, e.g., one of the two or more computing systems. The message 400 includes information 406 for mapping data. Alternatively, the message 400 does not include such information. The message 400 includes content 408 that includes enterprise data 410.

As shown in FIG. 3, the message hub 100 determines whether criteria for message selection include a requirement that is based on message content (step 304). Such a requirement can specify, for example, that only messages whose content include a customer order for a particular company is selected. Criteria for selection can be configurable and can be, for example, the criteria provided by the request described above in reference to FIG. 2.

If it is determined that the criteria include such a requirement, then the message hub 100 performs an initial selection (step 306). The initial selection is based on all requirements of the criteria except for the one that is based on-message content, for example, requirements relating to source, destination, and time. The initial selection can be effected by the above-described message selector 108.

The message hub 100 extracts the content of messages selected in the initial selection (step 308). Extraction yields any enterprise data included in the content of a message. Extraction can be effected by the above-described smart extractor. The extraction process is further described below in reference to FIG. 5.

The message hub 100 performs a second selection based on the requirement that is based on message content (step 310). The second selection can be effected by the above-described message selector 108.

If it is determined that the criteria do not include such a requirement, then the message hub 100 performs a full selection (step 312). The full selection is based on all requirements of the criteria. The full section can be effected by the above-described message selector 108.

The message hub 100 extracts the content of messages selected in the full selection (step 314). Extraction here is the same as the above described extraction step 308.

The message hub routes each message to its destination(s) (step 316). The destination is typically specified by information included in the message header.

The message hub 100 obtains traffic flow information for the selected messages (step 318). As indicated above, traffic flow information can generally include information that indicates where messages are coming from, where messages are going to, and the number of messages that are routed, through some particular path or node, per unit of time.

In one implementation, the message hub 100 time stamps each received message. The message can thus use the time stamp to obtain information about the message traffic, including, for example, calculating how many selected messages were received during a certain time period (e.g., how many reservations for Hawaiian vacations were placed through Expedia in the month of December, or how many purchases of Google stock were made in the past half an hour).

Optionally, the message hub 100 analyzes the extracted enterprise data and its corresponding message traffic information (step 320). As mentioned above, the combination of extracted enterprise data and its corresponding message traffic information provides, in a sense, real-time information regarding enterprise data traffic. Analyses can be related to, for example, banking, stock trading, and any trade that can use such real-time information. Analysis can, for example, determine that a trip wire has been crossed. The following describes examples of a trip wire. Suppose that a large online book store has two online servers for Internet communication and online ordering. If one of the servers fails, online ordering may be degraded but is still possible. A process that monitors the online ordering process may not detect the failure because the process is still running. The above-described analysis, in contrast, can detect such a failure by including one or more trip wires, for example, a low threshold for response time per order and/or a low threshold for the number of order coming from a server in a period of time. Another example of a trip wire is a high threshold for changes in the distribution of financial transfers between or among geographical regions and/or legal jurisdictions. Such a trip wire can facilitate, for example, real-time detection of potential causes of changes in the distribution of financial transactions. The potential causes can be changes in interest rates, changes in currency exchange rates, changes import/export regulations, or bankruptcies. The message hub 100 reports the extracted enterprise data, its corresponding message traffic information, and the result of any analysis (step 322). Recipients of the reporting can include, for example, one of the two or more computing systems that use the message hub to exchange messages, a computing system that does not use the message hub, a business warehouse. The physical device on which a recipient operates can be remotely located from the device on which the message hub executes. Reporting can be effected through a network, which can be wireless. Example of the physical computing devices include and are not limited to servers, clients, personal computers, personal digital assistants, and cell phones. A recipient can perform its own analysis of the information provided by the message hub, in which case the message hub need not perform any analysis.

FIG. 5 shows a method 500 for extracting enterprise data from the content of a message received at the message hub. The message hub 100 identifies the source of the message (step 502). The source of the message can be identified by, for example, accessing information in the message header. The message hub 100 accesses a list of data mapping rules (step 504). The list can be an index for a database table accessible to the message hub 100. The message hub 100 selects, among the rules of the list and based on the source identified, a data mapping rule (step 506). The message hub 100 retrieves the rule selected (step 508) and uses the rule to extract enterprise data from the content of the message (step 510).

FIG. 6 shows a business warehouse system 600 in accordance with the invention. The system 600 includes a message hub 602, which can be, for example, the message hub 100. The system 600 also includes a business warehouse 604, and two or more source systems, for example, source systems 606, 608, and 610. The source systems can be two or more computing systems described above in reference to FIG. 1. All traffic exchanged between the source systems is routed through the message hub 602. The system 600 processes messages exchanged between or among the source systems as discussed above. The extracted enterprise data and message traffic information (i.e., the enterprise data traffic) can be sent to the business warehouse 604, which can include a robust analyzer and a vast amount of historical enterprise data traffic. The real-time information regarding enterprise traffic that the message hub provides (as discussed above) can thus be analyzed in view of the historical enterprise data traffic.

The invention can be implemented in digital electronic circuitry, or in computer hardware, firmware, software, or in combinations of them. The invention can be implemented as a computer program product, i.e., a computer program tangibly embodied in an information carrier, for example, in a machine-readable storage device, for execution by, or to control the operation of, data processing apparatus, for example, a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. Information carriers suitable for embodying computer program instructions and data include all forms of non-volatile memory, including by way of example semiconductor memory devices, for example, EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, for example, a data server, or that includes a middleware component, for example, an application server, or that includes a front-end component, for example, a client computer having a graphical user interface or a Web browser through which a user can interact with an implementation of the invention, or any combination of such back-end, middleware, or front-end components. The components of the system can be interconnected by any form or medium of digital data communication, for example, a communication network. Examples of communication networks include a local area network ("LAN"), a wide area network ("WAN"), and the Internet.

A number of implementations of the invention have been described. Nevertheless, it will be understood that various modifications may be made without departing from the spirit and scope of the invention. For example, messages may be selected using source system information, destination system information, both types of information, or according to other criteria such as message size. Additionally, process steps can be performed in different order, for example, obtaining message traffic information can be done before extraction, during extraction, or after extraction. Accordingly, other implementations are within the scope of the following claims.

What is claimed is:

1. A computer-implemented method, comprising:
   receiving and time stamping at a message hub one or more messages from one or more sources, at least one of the one or more messages including enterprise data;
   selecting a message from among the one or more messages using a criterion;
   using an extractor implemented at the message hub to extract enterprise data from the selected message;
   obtaining traffic flow information related to the selected message, the traffic flow information including a number of messages routed through a particular path per unit of time based on the time stamp from the message hub, the particular path including an identification of one or more nodes within the path, the path being indicative of a source of each of the one or more messages and a destination of each of the one or more messages;
   generating a message that contains the extracted enterprise data and the traffic flow information;
   selecting a destination for the message that contains the extracted enterprise data and the traffic flow information; and
   sending the message that contains the extracted enterprise data and the traffic flow information to the destination.

2. The method of claim 1, wherein:
   the enterprise data and the flow traffic information are extracted and obtained, respectively, in real-time.

3. The method of claim 1, further comprising:
   analyzing the extracted enterprise data in view of the information regarding message traffic.

4. The method of claim 3, wherein:
   the analyzing is performed by one of the message hub, the source, the destination, or a business warehouse.

5. The method of claim 1, wherein the selecting of the selected message includes:
   selecting based on configurable criteria that include one or more requirements pertaining to one of a source of the message, a destination of the message, a point in time, a time period, or content of the selected message.

6. The method of claim 1, wherein the extraction of the enterprise data includes:
   selecting one or more data mapping rules that can be used to extract the enterprise data from the selected message.

7. The method of claim 6, further comprising:
   sending to a business warehouse the message that contains the extracted enterprise data and the traffic flow information, the business warehouse implementing a particular data model, wherein the selecting of one or more mapping rules includes selecting based on one of a source of the selected message, a destination of the selected message, or the data model implemented by the business warehouse.

8. The method of claim 1, wherein the obtaining of the traffic flow information includes:
calculating a number of messages of interest received at the message hub, wherein a message of interest is one that satisfies user configurable criteria and the message selected from the one or more messages is selected by using the same configurable criteria.

9. The method of claim 1, wherein the sending of the message that contains the extracted enterprise data and the traffic flow information to a destination includes:
sending the message that contains the extracted enterprise data and the traffic flow information to one of a business warehouse, a source system, a server, a client, a computing device, a personal digital assistant, or a cell phone.

10. A business warehouse system, comprising:
one or more source systems configured to communicate with each other by exchanging one or more messages, at least one of the one or more messages including enterprise data;
a message hub through which all message exchanged between or among the one or more source systems are routed, the message hub including an extractor and being configured to select a message from among the one or more messages, time stamp the one or more messages, use the extractor to extract enterprise data from the selected message, and obtain traffic flow information through the message hub, the traffic flow information including a number of messages routed through a particular path per unit of time based on the time stamp, the particular path including an identification of one or more nodes within the path, the path being indicative of a source of each of the one or more messages and a destination of each of the one or more messages, and generate a message that contains the extracted enterprise data and the traffic flow information; and
a business warehouse connected to receive, in real-time and from the message hub, the message that contains the extracted enterprise data and the traffic flow information.

11. The system of claim 10, wherein:
the message hub includes an analyzing engine configured to analyze, in real-time, the enterprise data in conjunction with the information regarding message traffic.

12. A non-transitory computer program product, tangibly stored on machine readable medium, comprising instructions operable to cause a processor to perform operations including:
receiving and time stamping at a message hub one or more messages from one or more sources, at least one of the one or more messages including enterprise data;
selecting a message from among the one or more messages using a criterion;
using an extractor implemented at the message hub to extract enterprise data from the selected message;
obtaining traffic flow information related to the selected message, the traffic flow information including a number of messages routed through a particular path per unit of time based on the time stamp from the message hub, the particular path including an identification of one or more nodes within the path, the path being indicative of a source of each of the one or more messages and a destination of each of the one or more messages;
generating a message that contains the extracted enterprise data and the traffic flow information;
selecting a destination for the message that contains the extracted enterprise data and the traffic flow information; and
sending the message that contains the extracted enterprise data and the traffic flow information to the destination.

13. The non-transitory computer program product of claim 12, wherein:
the enterprise data and the traffic flow information are extracted and obtained, respectively, in real-time.

14. The non-transitory computer program product of claim 12, further comprising instructions to:
analyze the extracted enterprise data in view of the information regarding message traffic.

15. The non-transitory computer program product of claim 14, wherein:
the analyzing is performed by one of the message hub, the source, the destination, or a business warehouse.

16. The non-transitory computer program product of claim 12, wherein the instructions to select the selected message include instructions to:
select based on configurable criteria that include one or more requirements pertaining to one of a source of the message, a destination of the message, a point in time, a time period, or content of the selected message.

17. The non-transitory computer program product of claim 12, wherein the instructions to extract include instructions to:
select one or more data mapping rules that can be used to extract the enterprise data from the selected message.

18. The non-transitory computer program product of claim 17, further comprising instructions to:
send to a business warehouse the message that contains the extracted enterprise data and the traffic flow information, the business warehouse implementing a particular data model, wherein the selecting of the one or more mapping rules includes selecting based on one of a source of the selected message, a destination of the selected message, or the data model implemented by the business warehouse.

19. The non-transitory computer program product of claim 12, wherein the instructions to obtain the traffic flow information include instructions to:
calculate a number of messages of interest received at the message hub, wherein a message of interest is one that satisfies user configurable criteria and the message selected from the one or more messages is selected by using the same configurable criteria.

20. The non-transitory computer program product of claim 12, wherein the instructions to send the message that contains the extracted enterprise data and the traffic flow information to a destination include instructions to:
send the message that contains the extracted enterprise data and the traffic flow information to one of a business warehouse, a source system, a server, a client, a computing device, a personal digital assistant, or a cell phone.

* * * * *